United States Patent
Sawada et al.

(10) Patent No.: US 7,836,716 B2
(45) Date of Patent: Nov. 23, 2010

(54) REFRIGERANT CYCLE DEVICE AND CONTROL SYSTEM FOR VEHICLE

(75) Inventors: Yoshikatsu Sawada, Kariya (JP); Yasutane Hijikata, Nagoya (JP); Hiromasa Tanaka, Ichinomiya (JP); Takashi Tanaka, Obu (JP)

(73) Assignee: DENSO CORPORATION, Kariya (JP)

( * ) Notice: Subject to any disclaimer, the term of this patent is extended or adjusted under 35 U.S.C. 154(b) by 276 days.

(21) Appl. No.: 11/581,441

(22) Filed: Oct. 17, 2006

(65) Prior Publication Data

US 2007/0101736 A1 May 10, 2007

(30) Foreign Application Priority Data

Nov. 7, 2005 (JP) ............................. 2005-322889

(51) Int. Cl.
*F25B 49/00* (2006.01)
*B60H 1/32* (2006.01)
(52) U.S. Cl. ........................................ 62/228.4; 62/133
(58) Field of Classification Search ................... 62/133, 62/193, 228.5, 230, 208, 228.1, 228.4; 60/430; 417/222.2; 700/276; 701/48–49
See application file for complete search history.

(56) References Cited

U.S. PATENT DOCUMENTS

| | | | | |
|---|---|---|---|---|
| 4,510,764 A | * | 4/1985 | Suzuki | 62/133 |
| 4,934,157 A | * | 6/1990 | Suzuki et al. | 62/228.5 |
| 5,117,643 A | * | 6/1992 | Sakurai et al. | 62/133 |
| 5,257,507 A | * | 11/1993 | Taguchi | 62/133 |
| 5,884,497 A | * | 3/1999 | Kishita et al. | 62/193 |
| 5,893,272 A | | 4/1999 | Hanselmann et al. | |
| 6,119,473 A | * | 9/2000 | Kishita et al. | 62/228.4 |
| 6,356,825 B1 | | 3/2002 | Takenaka et al. | |
| 6,385,982 B1 | * | 5/2002 | Ota et al. | 62/209 |

(Continued)

FOREIGN PATENT DOCUMENTS

DE  101 30 412  3/2003

(Continued)

OTHER PUBLICATIONS

Notice of Preliminary Rejection dated Jul. 31, 2007 issued in the corresponding Korean patent application No. 10-2006-0108507 (and English translation).

(Continued)

*Primary Examiner*—Frantz F Jules
*Assistant Examiner*—Emmanuel Duke
(74) *Attorney, Agent, or Firm*—Posz Law Group, PLC

(57) ABSTRACT

A refrigerant cycle device includes a compressor driven by a vehicle engine for drawing and compressing gas refrigerant from an evaporator, a variable displacement mechanism which varies a discharge capacity of the compressor based on a control value from an exterior to approach a suction pressure of the compressor to a predetermined suction pressure, and a control unit for controlling the discharge capacity of the compressor. The control unit includes a determining part for determining an accelerating state of the vehicle engine, a detecting member which detects a thermal load of the evaporator, a setting part for setting a minimum control value in accordance with the thermal load, and a controlling part. The controlling part reduces the control value to the minimum control value and returns the reduced control value to a control value before the reducing, when the determining means determines an accelerating state of the vehicle engine.

21 Claims, 5 Drawing Sheets

U.S. PATENT DOCUMENTS

| | | | |
|---|---|---|---|
| 6,463,749 B2 * | 10/2002 | Niimi | 62/228.1 |
| 6,481,225 B2 * | 11/2002 | Kimura et al. | 62/133 |
| 6,804,970 B2 | 10/2004 | Saeki et al. | |
| 6,840,055 B2 * | 1/2005 | Iritani | 62/230 |
| 2002/0100285 A1 | 8/2002 | Baruschke et al. | |
| 2003/0018415 A1 * | 1/2003 | Sonobe et al. | 700/275 |
| 2003/0131612 A1 * | 7/2003 | Wakisaka et al. | 62/133 |
| 2007/0261420 A1 | 11/2007 | Baruschke et al. | |

FOREIGN PATENT DOCUMENTS

| | | |
|---|---|---|
| DE | 103 00 571 | 7/2004 |
| JP | A-57-175422 | 10/1982 |
| JP | 2000335232 A * | 12/2000 |
| JP | A-2000-335232 | 12/2000 |
| JP | 2003-285618 | 10/2003 |
| JP | A-2005-247191 | 9/2005 |

OTHER PUBLICATIONS

Office Action dated Dec. 4, 2008 in corresponding German patent application No. 10 2006 051 998.1 (and English translation).

Office Action dated Jun. 15, 2010 from the Japan Patent Office in corresponding JP Patent Application No. 2005-322889 (English translation).

* cited by examiner

REFRIGERANT CYCLE DEVICE AND CONTROL SYSTEM FOR VEHICLE

CROSS REFERENCE TO RELATED APPLICATION

This application is based on Japanese Patent Application No. 2005-322889 filed on Nov. 7, 2005, the contents of which are incorporated herein by reference in its entirety.

FIELD OF THE INVENTION

The present invention relates to a refrigerant cycle device for a vehicle, which can control a discharge capacity of a compressor that is driven by a vehicle engine. More particularly, the present invention relates to a control system for controlling a discharge capacity of a compressor.

BACKGROUND OF THE INVENTION

In a refrigerant cycle device for a vehicle described in JP-A-2000-335232, a variable displacement mechanism is provided for changing a discharge capacity (displacement) of a compressor based on a control signal from an exterior. In this refrigerant cycle device, when a controller determines an accelerating state of the vehicle engine, the compressor is stopped for a predetermined time, and thereafter, the variable displacement mechanism is set at a partial capacity state so that the compressor operates with a partial discharge capacity. After the compressor operates with the partial discharge capacity, the compressor operates with 100% discharge capacity.

Accordingly, immediately after an accelerating start of the vehicle engine, the compressor driving power by the vehicle engine becomes zero, and the accelerating property of the vehicle can be improved. Then, because the compressor operates with the partial discharge capacity, a refrigerant circulating amount in the refrigerant cycle device can be maintained at a predetermined flow amount, thereby reducing a temperature increase in air blown into a vehicle compartment. However, according to studies of the present inventors, the following problem may be caused in this control of the compressor.

FIG. 8 shows a swash-plate type compressor 2 having a variable displacement mechanism (control valve) 15. The variable displacement mechanism 15 adjusts the pressure in a crank chamber 22 so as to change a tilted angle of a swash plate 21 and control the discharge capacity of the compressor 2. Furthermore, as shown in FIG. 9, the variable displacement mechanism (control valve) 15 includes a valve body 15b and an electromagnetic coil 15a for pushing the valve body 15b, and is connected to the crank chamber 22, a discharge chamber 24 and a suction chamber 23 through passages 25 in the compressor 2. In the variable displacement mechanism 15, by using a balance between the pushing force Pf of the electromagnetic coil 15a and the suction pressure Ps from the suction chamber 23, the open degree of the valve body 15b positioned in the passage 25 between the crank chamber 22 and the discharge chamber 24 is adjusted, thereby adjusting the pressure Pc of the crank chamber 22.

For example, when the suction pressure Ps is larger than a predetermined pressure value, the valve body 15b moves in a valve-closing direction. In this case, the passage 25 from the discharge chamber 24 to the crank chamber 22 becomes in a shutting state, thereby the discharge capacity becomes larger and the suction pressure Ps is lowered. In contrast, when the suction pressure Ps is smaller than the predetermined pressure value, the valve body 15b moves in a valve-opening direction. In this case, high-pressure refrigerant flows from the discharge chamber 24 to the crank chamber 22, thereby the discharge capacity becomes smaller and the suction pressure Ps is increased. As a result, the suction pressure Ps can approach a predetermined value.

Because the compressor 2 has the above characteristics, a necessary discharge capacity of the compressor 2, to be controlled in accordance with a thermal load of an evaporator, is different, and the driving power of the compressor 2 is also different, even when the control current value is made the same. For example, when the thermal load of the evaporator is small, the suction pressure Ps becomes lower, In this case, the necessary discharge capacity of the compressor 2 is small, and the driving power of the compressor 2 becomes small. In contrast, when the thermal load of the evaporator is large, the suction pressure Ps becomes higher, In this case, the necessary discharge capacity of the compressor 2 for obtaining the suction pressure Ps is large, and the driving power of the compressor 2 becomes large.

Thus, at a time where the accelerating control of the vehicle engine is performed, when the thermal load is changed, the compressor driving power is not determined only in accordance with a decrease of the control current. For example, if the control current is lowered when the thermal load is small, the discharge capacity may be excessively lowered. In this case, a time for increasing the discharge capacity after this control becomes longer, and unpleasant feeling may be given to an occupant in a vehicle compartment. In contrast, if the control current is lowered when the thermal load is large, the discharge capacity of the compressor cannot be sufficiently decreased, and consumed power of the vehicle engine cannot be effectively reduced.

SUMMARY OF THE INVENTION

In view of the foregoing problems, it is an object of the present invention to provide a refrigerant cycle device for a vehicle, which can improve cooling capacity while accelerating performance of a vehicle engine can be improved.

It is another object of the present invention to provide a control system for effectively controlling a discharge capacity of a compressor without deteriorating accelerating performance of a vehicle engine.

According to an aspect of the present invention, a refrigerant cycle device for a vehicle includes an evaporator for cooling air to be blown into a compartment of the vehicle, a compressor driven by a vehicle engine through a power transmission mechanism for drawing and compressing gas refrigerant evaporated in the evaporator, a variable displacement mechanism which varies a discharge capacity of the compressor based on a control value from an exterior to approach a suction pressure of the compressor to a predetermined suction pressure, and a control unit for controlling the discharge capacity of the compressor. Furthermore, the control unit includes a determining means for determining an accelerating state of the vehicle engine, a detecting member which detects a thermal load of the evaporator, a setting means for setting a minimum control value, in accordance with the thermal load detected by the detecting member, in an allowable capacity of the compressor, and a controlling means which reduces the control value applied to the variable displacement mechanism to the minimum control value set by the setting means, and returns the reduced control value to a control value before the reducing, when the determining means determines an accelerating state of the vehicle engine.

Because the control value is reduced to the minimum control value that is set by the setting means in accordance with the thermal load at a time of accelerating state of the vehicle engine, it is possible to control the minimum control value based on the thermal load without depending on the suction pressure of the compressor. Accordingly, in a case where the suction pressure of the compressor is controlled in a predetermined pressure, the refrigerant cycle device can improve both the accelerating performance of the vehicle engine and the cooling performance of the evaporator.

For example, the setting means may set the minimum control value to be smaller as the thermal load is larger, and the setting means may set a decrease rate of the minimum control value to be smaller as the thermal load is larger than a predetermined load. Furthermore, the detecting member may detect the thermal load by detecting a temperature of air cooled by the evaporator or by detecting a suction pressure of the compressor.

According to another aspect of the present invention, a control system for controlling a discharge capacity of a compressor of a refrigerant cycle device includes a variable displacement mechanism which varies the discharge capacity of the compressor based on a control value from an exterior to set a suction pressure of the compressor to a predetermined suction pressure, and a control unit for controlling the discharge capacity of the compressor. The control unit further includes a determining means for determining an accelerating state of the vehicle engine, a detecting member which detects a thermal load of the refrigerant cycle device, a setting means for setting a minimum control value in accordance with the thermal load detected by the detecting member in an allowable capacity of the compressor, and a controlling means. The controlling means reduces the control value applied to the variable displacement mechanism to the minimum control value set by the setting means, and returns the reduced control value to a control value before the reducing, when the determining means determines an accelerating state of the vehicle engine. Accordingly, the control system can effectively control the discharge capacity of the compressor without deteriorating the accelerating performance of the vehicle engine.

BRIEF DESCRIPTION OF THE DRAWINGS

Additional objects and advantages of the present invention will be more readily apparent from the following detailed description of preferred embodiments when taken together with the accompanying drawings. In the drawings.

DETAILED DESCRIPTION OF THE PREFERRED EMBODIMENTS

First Embodiment

Figure 1:
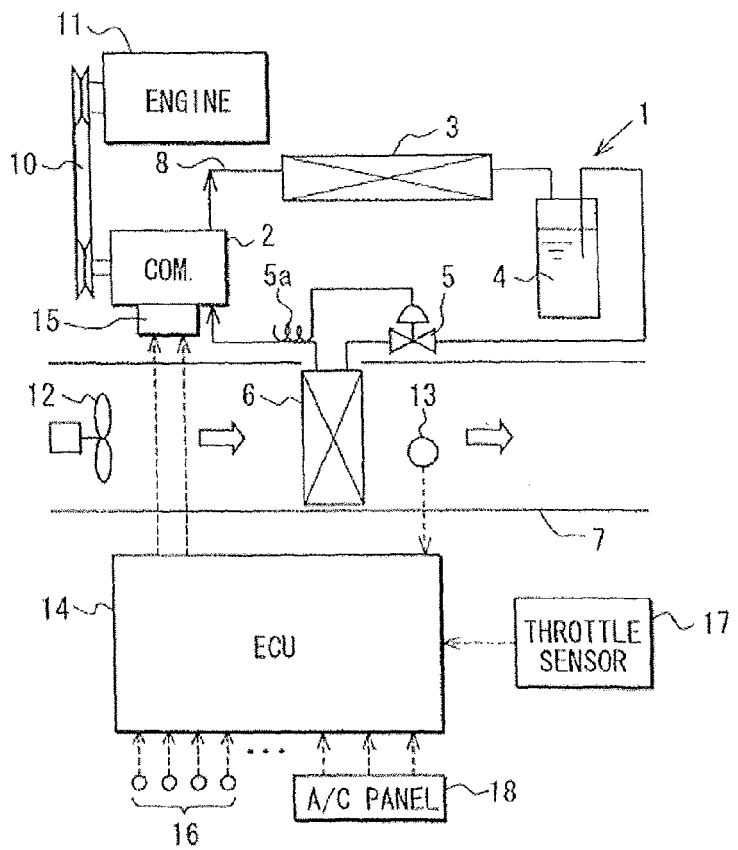
FIG. 1 is a schematic diagram showing a refrigerant cycle device for a vehicle according to a first embodiment of the present invention.
Figure 9:
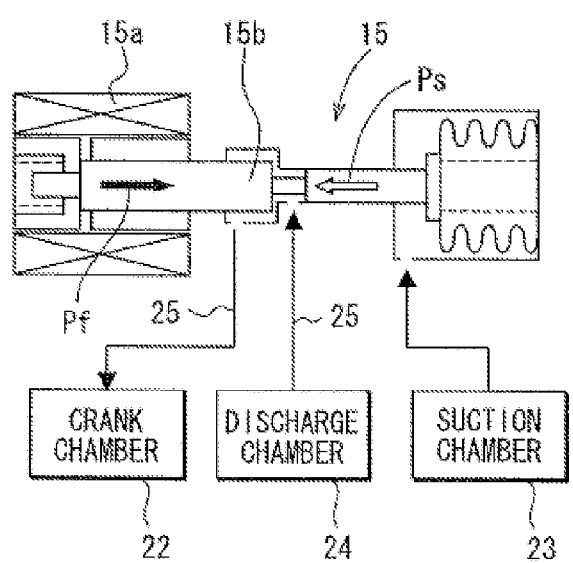
FIG. 9 is schematic diagram showing a variable displacement mechanism in the compressor of FIG. 8.
Figure 8:
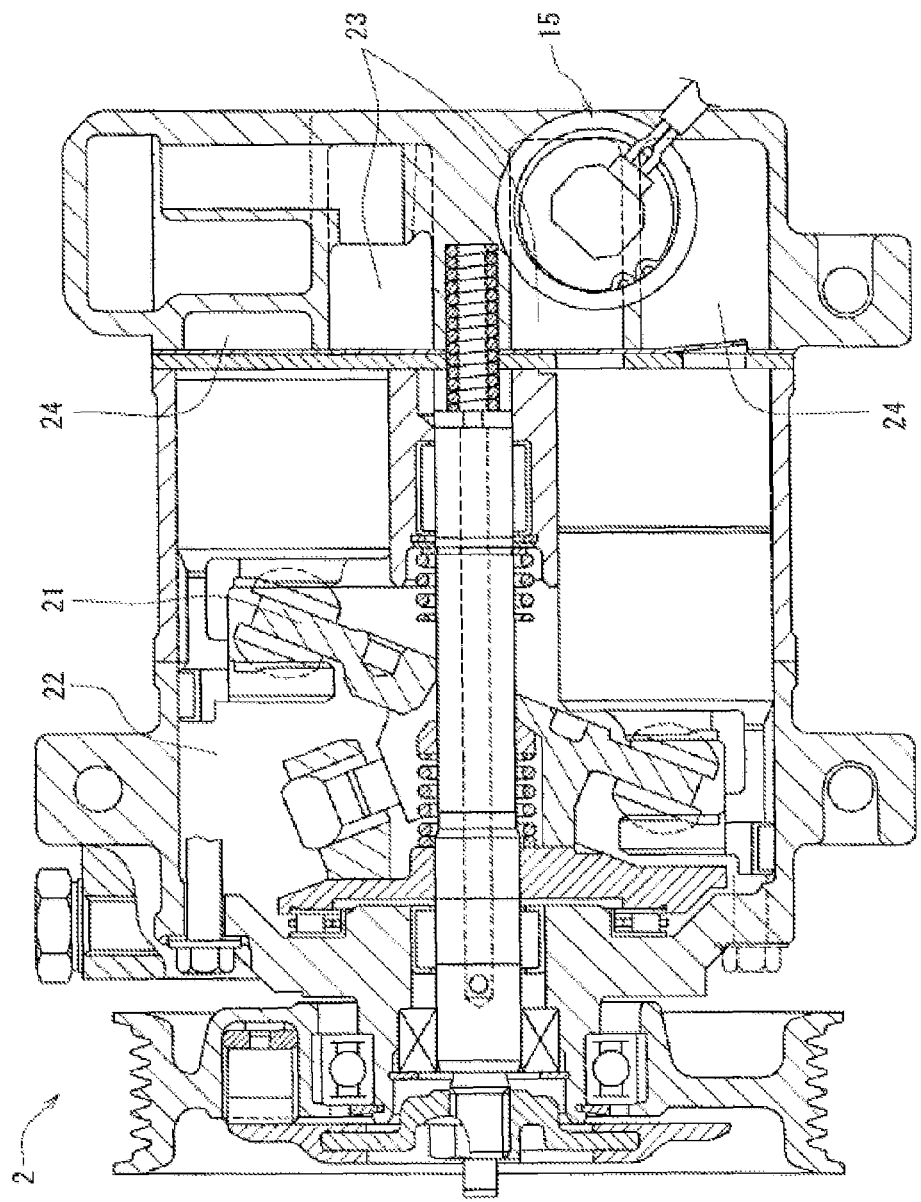
FIG. 8 is a schematic sectional view showing a swash-plate type variable displacement compressor.

FIG. 1 shows a refrigerant cycle device 1 having a compressor 2 for compressing refrigerant. As shown in FIG. 1, the compressor 2 is driven by an internal combustion engine 11 via a power transmission mechanism such as a belt 10 and the like, so that the compressor 2 draws and compresses refrigerant and discharges the compressed refrigerant. The compressor 2 is a swash-plate type variable-displacement compressor, which can continuously vary its discharge capacity by changing a tilt angle of a swash plate, which reciprocates a piston. For example, the compressor 2 has the structure shown in FIGS. 8 and 9.

The pressure of the refrigerant discharged from the compressor 2 is controlled by a variable displacement mechanism (pressure control valve) 15, and the pressure-controlled refrigerant is introduced to a chamber where the swash plate is received. The inner pressure of the chamber is controlled, so that tilt rotation moment, which works to the swash plate, is controlled. Thus, the discharge capacity of the compressor 2 is controlled. The variable displacement mechanism 15 is electrically controlled by a control signal (control value such as control current Ic) from an electronic control unit 14 so that the discharge capacity of the compressor 2 can be controlled. The discharge capacity of the compressor 2 becomes larger as the control current Ic applied to the variable displacement mechanism 15 becomes larger. The discharge capacity of the compressor 2 can be continuously changed between 0 and 100% capacity. The discharge capacity of the compressor 2 is an amount of refrigerant discharged by one revolution of a shaft of the compressor 2, for example.

A condenser 3 is a high-pressure side heat exchanger for cooling and condensing refrigerant. The condenser 3 performs heat exchange between high-pressure high-temperature refrigerant discharged from the compressor 2 and exterior air blown by a cooling fan (not shown).

A liquid receiver 4 is a gas/liquid separator for separating refrigerant flowing from the condenser 3 into vapor-phase refrigerant and liquid-phase refrigerant. The liquid-phase refrigerant is accumulated in the liquid receiver 4 as surplus refrigerant. The accumulated liquid-phase refrigerant is supplied from the liquid receiver 4 toward an expansion valve 5. The expansion valve 5 is a decompression unit for decompressing high-pressure liquid refrigerant supplied from the liquid receiver 4 to be in a gas-liquid two-phase state. In this embodiment, a thermal expansion valve is used as the expansion valve 5. The expansion valve 5 has a thermal sensing cylinder 5a for sensing a temperature of refrigerant at an outlet side of an evaporator 6. In this case, the expansion valve 5 controls its throttle opening degree, so that superheat degree of refrigerant, which is drawn into the compressor 2 from the outlet side of the evaporator 6, is controlled at a predetermined superheat degree.

The evaporator 6 is a low-pressure side heat exchanger, which performs heat exchange between low-pressure refrigerant and air to be blown into a vehicle compartment. The low-pressure refrigerant decompressed by the expansion valve 5 is evaporated in the evaporator 6, so that the air to be blown into the vehicle compartment is cooled. For example, the evaporator 6 is located in an air conditioning duct 7 through which air flows into the vehicle compartment. In this case, the low pressure refrigerant flowing into the evaporator 6 is evaporated by absorbing heat from air passing through the air conditioning duct 7, so that the air is cooled.

The compressor 2, the condenser 3, the liquid receiver 4, the expansion valve 5, the evaporator 6, etc. are connected by piping to construct a refrigerant cycle.

A blower 12 is provided in the air-conditioning duct 7 for blowing air toward the vehicle compartment. The blower 12 blows interior air or/and exterior air drawn from an interior/exterior air switching box (not shown). The interior air is air inside of the vehicle compartment, and the exterior air is air outside of the vehicle compartment.

A heater (not shown) is provided in the air-conditioning duct 7 downstream of the evaporator 6 with respect to an air flow direction. Air after passing through the evaporator 6, is heated by the heater. The heater controls an air heating amount, for example, so that the temperature of the air to be blown into the vehicle compartment is controlled. A post-evaporator temperature sensor 13 is provided proximately to a downstream side of an air outlet port of the evaporator 6 in the air-conditioning duct 7, for detecting a temperature of blown air immediately after passing through the evaporator 6. The post-evaporator temperature sensor 13 can be used for detecting the cooling capacity (thermal load) of the evaporator 6, in this embodiment. A temperature detecting signal (Te) of the post-evaporator temperature sensor 13 is input to an electronic control unit (ECU) 14.

Next, a control system of the present embodiment will be now described with reference to FIG. 1. The ECU 14 includes a micro-computer constructed with a CPU, a ROM and a RAM, and connecting circuits. The electronic control unit 14 has an input terminal to which various kinds of signals such as detecting signals of sensors 16 necessary for air conditioning, and operation signals from operation switches of the air-conditioning operation panel 18 (A/C panel) are input. The sensors 16 include an interior temperature sensor for detecting the temperature of interior air, an exterior temperature sensor for detecting the temperature of exterior air, a solar radiation sensor for detecting a solar radiation entering into the vehicle compartment, an engine water temperature sensor for detecting a temperature of hot water flowing into the heater core, and the post-evaporator temperature sensor 13 which is for detecting the temperature (e.g., air temperature) Te of the evaporator 6. In addition, as a detecting unit for detecting an accelerating state (high load state) of the engine 11, a throttle sensor 17 which generates a signal in accordance with a throttle open degree of the engine 11 is connected to the input terminal of the ECU 14.

The operation switches of the air conditioning operation panel 18 include an automatic switch for setting an automatic air conditioning control, a temperature setting switch for setting a set temperature in the vehicle compartment, an air blowing amount selecting switch, a blowing mode selecting switch, an interior/exterior air selecting switch, and an air conditioner switch (A/C switch) which is for turning the compressor 2 ON and OFF. The air conditioner switch can set the discharge capacity of the compressor 2 at zero or an arbitrary value.

Figure 2:
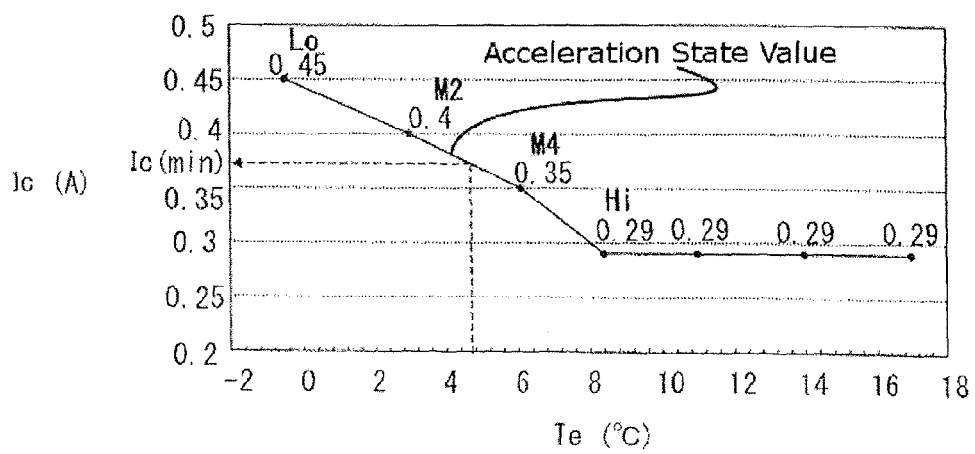
FIG. 2 is a control map for determining a lowest control current (minimum control current) according to the first embodiment.

The ROM of the ECU 14 stores the control map shown in FIG. 2. The control map indicates the relationship between the post-evaporator temperature Te (thermal load of the evaporator 6) and a control current Ic applied to the variable displacement mechanism 15. Here, the thermal load of the evaporator 6 is indicated as the post-evaporator temperature Te, as an example in this embodiment. The control map of FIG. 2 is used for controlling the discharge capacity of the compressor 2 when an accelerating state of the engine 11 is determined. That is, FIG. 2 is a map of an acceleration state valve of the control current Ic.

Figure 3A:
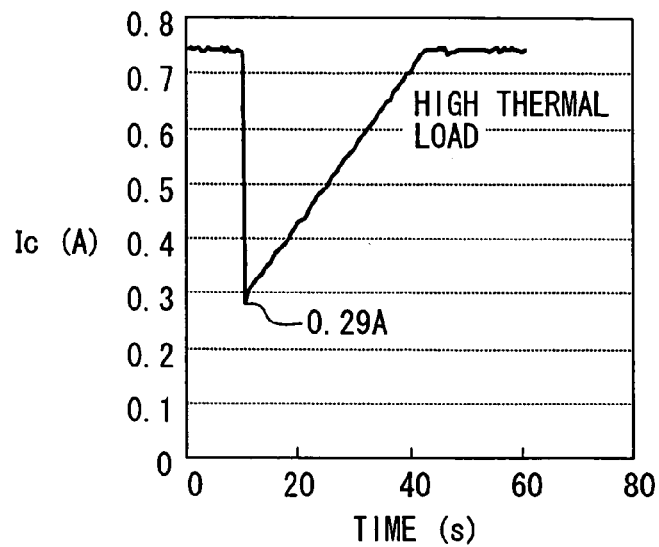
FIG. 3A is a graph showing a change of a control current Ic for making the control map.
Figure 3B:
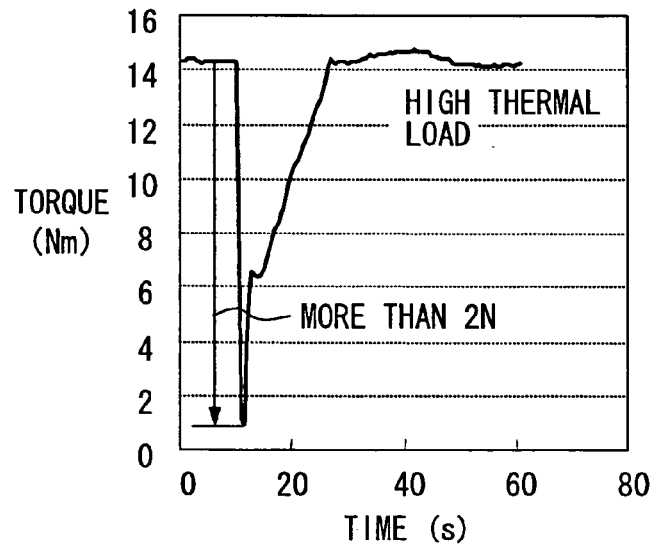
FIG. 3B is a graph showing a change of a torque for making the control map.
Figure 3C:
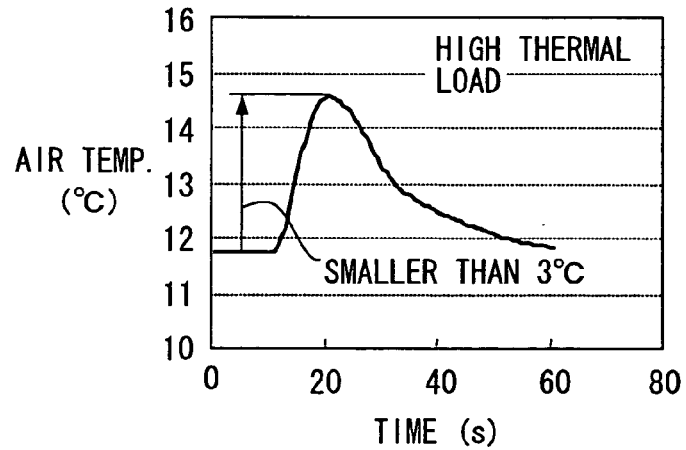
FIG. 3C is a graph showing an air temperature to be blown for making the control map.

The control current Ic of the control map of FIG. 2 is set relative to the post-evaporator temperature Te of the evaporator 6 when the air amount blown from the blower 12 becomes higher in this order of Lo, M2, M4 and Hi, for example. Furthermore, in a case where the control current Ic decreases from a normal operation, the relationship of the control current Ic with the post-evaporator temperature Te is taken when a torque decrease amount due to a decrease amount of the discharge capacity of the compressor 2 is equal to or larger than a predetermined amount (e.g., 2N) and an increased temperature of air blown into the vehicle compartment is equal to or lower than a predetermined temperature (e.g., 3° C.). FIG. 3A shows a variation in the control current Ic at a high thermal load Hi, FIG. 3B shows a variation in the torque of the compressor 2 at the high thermal load Hi, and FIG. 3C shows a variation in the temperature of air blown into the vehicle compartment at the high thermal load Hi.

The predetermined amount (e.g., 2N) of the torque decrease of the compressor 2 is set as a value that is necessary for obtaining the accelerating performance of the engine 11 by reducing the compressor driving power relative to the engine 11. The predetermined temperature (e.g., 3° C.) of the increased temperature of air blown into the vehicle compartment is set such that an unpleasant feeling given to an occupant in the vehicle compartment, due to the increased temperature of air, is in an allowable range.

A minimum control current Ic (min) can be calculated based on the post-evaporator temperature Te (thermal load) by using the control map. Therefore, in this embodiment, the minimum control current Ic (min), capable of obtaining the allowable capacity in accordance with the thermal load, can be set.

In the control map shown in FIG. 2, the control current Ic is set smaller as the post-evaporator temperature Te is larger. However, when the post-evaporator temperature Te becomes larger than a predetermined temperature (e.g., 8° C.), that is, when the thermal load of the evaporator 6 is larger than a predetermined value, the control current Ic is made almost constant. In this case, a decrease rate of the control current Ic becomes small (almost zero).

Figure 4:
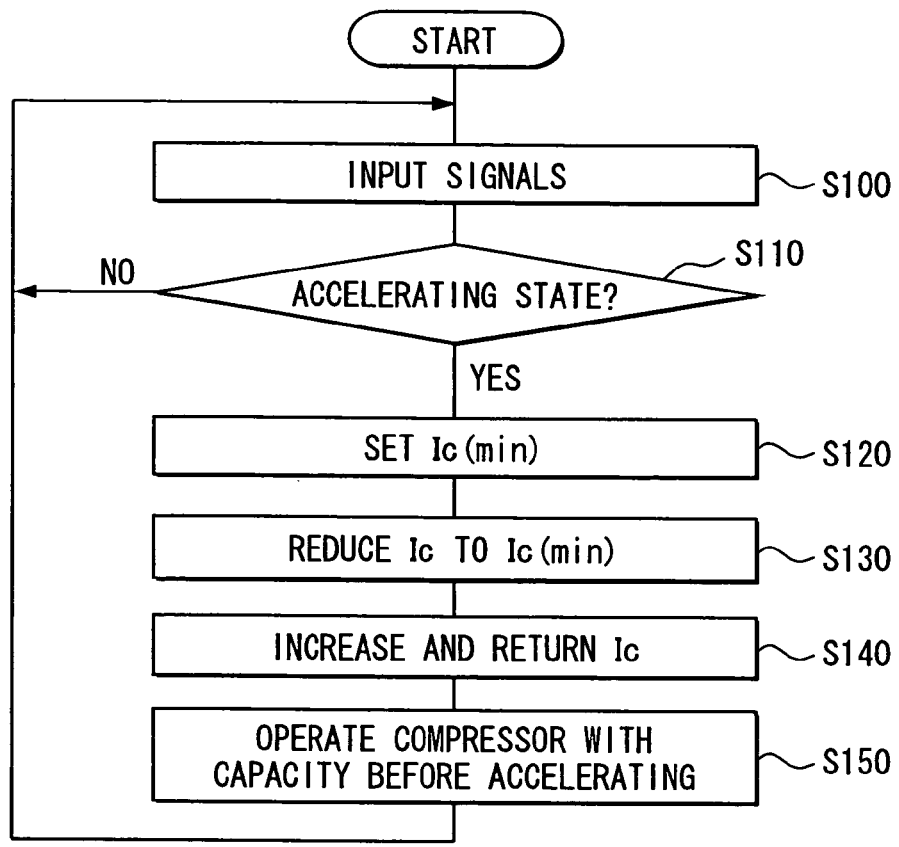
FIG. 4 is a flow diagram showing a control process according to the first embodiment.
Figure 5:
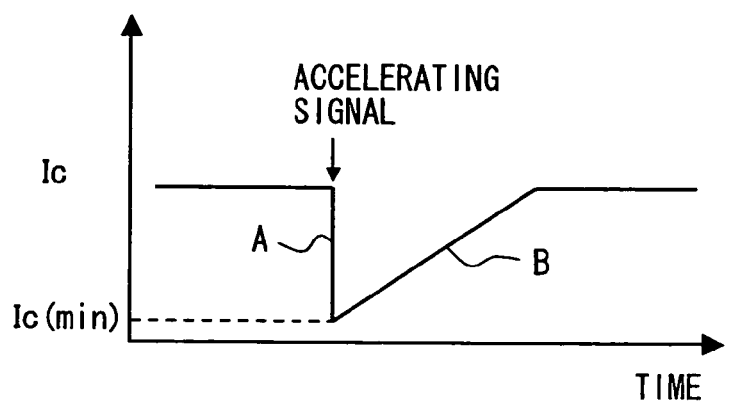
FIG. 5 is a time chart showing a variation in the control current Ic in the control process of FIG. 4 when an accelerating state is detected.
Figure 6:
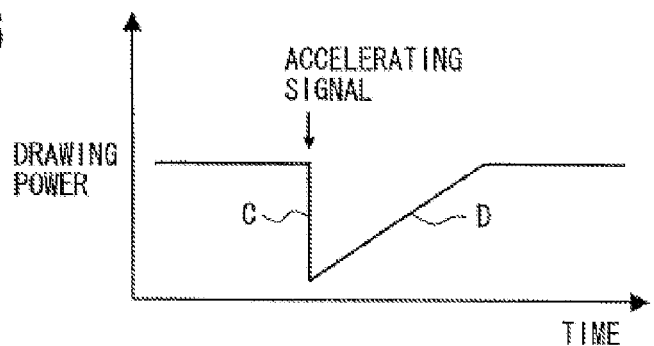
FIG. 6 is a time chart showing a variation in a compressor driving power in the control process of FIG. 4 when the accelerating state is detected.

Next, the control operation of the ECU 14 according to this embodiment will be now described with reference to FIGS. 4-6. FIG. 4 is a flowchart showing a control process performed by the ECU 14, FIG. 5 is a time chart showing a variation in the control current Ic when an accelerating state is detected, and FIG. 6 is a time chart showing a variation in the driving power of the compressor 2 when the accelerating state is detected.

When an ignition switch of the engine 11 is turned on and the automatic switch of the air conditioning operation panel 18 is turned on, the control routine of FIG. 4 is started.

The ECU 14 reads detection values of the sensors 13, 16, 17, and also reads operation signals from various operation switches of the air conditioning operation panel 18, at step S100. Next, a determining means of the ECU 14 determines whether or not the engine 11 is in an accelerating state at step S110. For example, the determining means of the ECU 14 determines an accelerating state, when the throttle open degree of the engine 11, detected by the throttle sensor 17, is larger than a predetermined value.

When an accelerating state of the engine 11 is not determined at step S110, the control program returns to step S100. When the determining means of the ECU 14 determines the accelerating state of the engine 11 at step S110, a setting means of the ECU 14 sets the minimum control current Ic (min) based on the control map in the ROM of ECU 14. That is, the setting means sets a control current Ic corresponding to the post-evaporator temperature Te (thermal load) obtained from the post-evaporator temperature sensor 13, as the minimum control current Ic (min).

Next, the control process moves from the setting means of step S120 to a controlling means (reduce-returning means) of step S130 and S140. At step S130, the control current Ic applied to the variable displacement mechanism 15 is reduced to the minimum control current Ic (min) that is set at step S120, as in the line A of FIG. 5. With this operation of reducing the control current Ic to the minimum control current Ic (min), the driving power of the compressor 2 due to the vehicle engine 11 is reduced as in the line C in FIG. 6, thereby increasing an accelerating rate of the engine 11. As described above, the minimum control current Ic (min) is set so that the temperature increase of air due to the decrease in the discharge capacity of the compressor 2 is equal to or smaller than 3° C. Then, at step S140, the minimum control current Ic (min) is increased by a predetermined rate as in the line B of FIG. 5. Therefore, the discharge capacity of the compressor 2 is increased and returned with the increase of the control current Ic. As shown by the line B in FIG. 5, the increased rate (increased amount) of the minimum control current Ic applied to the variable displacement mechanism 15 is set so that the driving power of the compressor 2 by the engine 11 is not rapidly increased. That is, the reduced driving power of the compressor 2 is smoothly returned as in the line D of FIG. 6 so that the cooling performance of the evaporator 6 can be smoothly increased without deteriorating the accelerating performance of the vehicle engine 11.

Next, at step S150, the compressor 2 is operated with the discharge capacity before the determination of the accelerating state.

In this embodiment, when an accelerating state is determined, the control current Ic applied to the variable displacement mechanism 15 is reduced to the minimum control current Ic (min) that is determined based on a decrease amount of the driving power of the compressor 2 and the allowable range of the cooling performance deterioration of the evaporator 6. That is, the discharge capacity of the compressor 2 at the accelerating state of the compressor 2 is reduced based on the set minimum control current Ic (min). Thus, even in the accelerating state, the discharge capacity of the compressor 2 can be set in accordance with the thermal load of the evaporator 6, without depending on the capacity variation for maintaining the suction pressure by the variable displacement mechanism 15. As a result, the discharge capacity of the compressor 2 can be reduced to an amount corresponding to the minimum control current Ic (min) at the time of the engine accelerating state, and then can be accurately returned to the discharge capacity at the state before the accelerating. Accordingly, both the accelerating performance of the vehicle engine 11 and the cooling performance of the evaporator 6 can be improved even in the compressor 2 in which the suction pressure control is controlled by the variable displacement mechanism 15.

Generally, in the compressor 2 with the suction pressure control, as the suction pressure becomes lower, the control current Ic during an increase of the capacity is required to be increased. Conversely, as the suction pressure becomes higher, the control current Ic during an increase of the capacity is required to be decreased. Because the suction pressure of the compressor 2 is changed relative to the thermal load of the evaporator 6, the control at the time of determining the accelerating state of the vehicle engine 11 can be performed in accordance with the characteristics of the compressor 2 with the suction pressure control.

In the control map of FIG. 2, when the thermal load is larger than a predetermined thermal load, that is, when the post-evaporator temperature Te is higher than a predetermined temperature, the decrease rate of the control current Ic for determining the minimum control current Ic (min) is made small. For example, in this embodiment, the minimum control current Ic (min) is set approximately at a constant value when the thermal load is larger than a predetermined thermal load. Therefore, it can prevent the control current Ic from being excessively decreased at a high thermal load, thereby preventing the cooling performance from being deteriorated in the control at an accelerating state or after the accelerating state.

In the compressor 2 having the variable displacement mechanism 15, by varying the discharge capacity to be approximately zero, the compressor driving power due to the engine 11 can be made approximately zero. Therefore, the compressor 2 can be always connected to the engine through the belt 10, without using a clutch mechanism.

Second Embodiment

The second embodiment of the present invention will be now described with reference to FIG. 7. In the second embodiment, the minimum control current Ic (min) is determined based on the control map of FIG. 7 in accordance with the suction pressure of the compressor 2.

Figure 7:
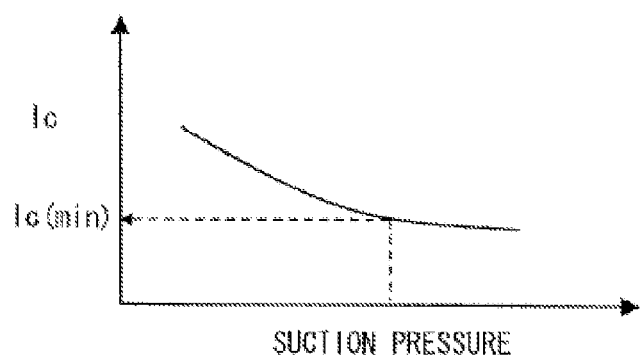
FIG. 7 is a control map for determining a lowest control current (minimum control current) according to a second embodiment of the present invention.

FIG. 7 shows the relationship between the control current Ic applied to the variable displacement mechanism 15 and the suction pressure of the compressor 2 detected by a pressure sensor. As shown in FIG. 7, the decrease rate of the control current Ic for determining the minimum control current Ic (min) is reduced when the suction pressure of the compressor 2 is larger than a predetermined value. For example, the control current Ic for determining the minimum control current Ic (min) can be set approximately constant when the suction pressure of the compressor 2 is larger than the predetermined value. Alternatively, the decrease rate of the control current Ic for determining the minimum control current Ic (min) may be set approximately constant in accordance with the cooling capacity of the evaporator 6 or the suction pressure.

Other Embodiments

Although the present invention has been fully described in connection with the preferred embodiments thereof with reference to the accompanying drawings, it is to be noted that various changes and modifications will become apparent to those skilled in the art.

For example, in the above-described first embodiment, the decrease rate of the minimum control current Ic (min) is made smaller when the thermal load of the control map for determining the minimum control current Ic (min) is large; however, the decrease rate can be made approximately at the same decrease rate.

At step S140 in the control flow of FIG. 4, the reduced control current Ic is increased by a predetermined increase amount (a predetermined increase rate) after the control current Ic is reduced to the minimum control current Ic (min). However, the increase rate of the control current Ic can be set gradually larger or can be set in step.

In the above-described embodiments, the accelerating state of the engine 11 is determined based on the throttle open degree of the engine 11. However, the accelerating state of the engine 11 may be determined based on an operation amount (pedal stepping amount) of an accelerating operation mechanism.

Furthermore, because the rotation speed of the engine 11 is related with the throttle open degree, the accelerating state of the engine 11 can be determined based on a rotation speed of the engine 11 or a rotation speed of the compressor 2.

Furthermore, as the compressor 2, any compressors such as a scroll type or a vane type other than the swash plate type can be used. In addition, the refrigerant cycle device using the compressor 2 can be suitably used for an air conditioner or a refrigerator.

Such changes and modifications are to be understood as being within the scope of the present invention as defined by the appended claims.

What is claimed is:

1. A refrigerant cycle device for a vehicle, comprising:
an evaporator for cooling air to be blown into a compartment of the vehicle;
a compressor, driven by a vehicle engine through a power transmission mechanism, for drawing and compressing gas refrigerant evaporated in the evaporator;
a control unit for controlling a discharge capacity of the compressor; and
a variable displacement mechanism, which is configured to vary the discharge capacity of the compressor based on a control value from the control unit and a suction pressure of the compressor, to cause the suction pressure of the compressor to approach a predetermined suction pressure, wherein the variable displacement mechanism increases the discharge capacity of the compressor when the suction pressure of the compressor increases, and wherein the variable displacement mechanism decreases the discharge capacity of the compressor when the control value from the control unit decreases,
wherein the control unit includes
a determining means for determining an acceleration state of the vehicle engine,
a detecting member which detects a thermal load of the evaporator,
a setting means for setting an acceleration state value of the control value, in accordance with the thermal load detected by the detecting member, when the determining means determines the acceleration state of the vehicle engine, wherein the setting means causes the acceleration state value to decrease as the thermal load increases, and
a controlling means for reducing the control value applied to the variable displacement mechanism from a value that was set prior to the reduction to the acceleration state value set by the setting means and subsequently returns the control value from the acceleration state value to the value that was set prior to the reduction, when the determining means determines the acceleration state of the vehicle engine.

2. The refrigerant cycle device according to claim 1, wherein when the thermal load is equal to or larger than a predetermined value, the setting means causes the acceleration state value to be smaller as compared with a case in which the thermal load is smaller than the predetermined value.

3. The refrigerant cycle device according to claim 1, wherein the setting means sets a rate of decline of the acceleration state value with respect to thermal load so that, if the thermal load is larger than a predetermined load, the rate of decline is reduced as compared with a case where the thermal load is smaller than the predetermined load.

4. The refrigerant cycle device according to claim 1, wherein the detecting member detects the thermal load by detecting a temperature of air cooled by the evaporator.

5. The refrigerant cycle device according to claim 1, wherein the detecting member detects the thermal load by detecting a suction pressure of the compressor.

6. The refrigerant cycle device according to claim 1, wherein the compressor is always in a connected state with the vehicle engine through the power transmission mechanism.

7. The refrigerant cycle device according to claim 1, wherein when the determining means determines the acceleration state of the vehicle, the controlling means reduces the control value to the acceleration state value and returns the control value gradually from the acceleration state value to the value that was set prior to the determination of the acceleration state, for a predetermined time.

8. The refrigerant cycle device according to claim 1, wherein the control value is an electrical current applied to the variable displacement mechanism.

9. The refrigerant cycle device according to claim 1, wherein the controlling means suddenly reduces the control value applied to the variable displacement mechanism from the value before the reduction to the acceleration state value and subsequently gradually increases the control value from the acceleration state value to the value that was set prior to the reduction, when the determining means determines that the acceleration state of the vehicle engine has occurred.

10. The refrigerant cycle device according to claim 1, wherein the controlling means is configured so that the reduction of the control value is relatively sudden, and the return of the control value to the value that was set prior to the reduction is relatively gradual.

11. The refrigerant cycle device according to claim 1, wherein the acceleration state is a state in which the engine is determined by the determining means to be accelerating the vehicle, and the acceleration state value is a value taken by the control value only when the engine is in the acceleration state.

12. A control system for controlling a discharge capacity of a compressor of a refrigerant cycle device, the control system comprising:
a control unit for controlling a discharge capacity of the compressor;
a variable displacement mechanism, which is configured to vary the discharge capacity of the compressor based on a control value from the control unit and a suction pressure of the compressor, to cause the suction pressure of the compressor to approach a predetermined suction pressure, wherein the variable displacement mechanism increases the discharge capacity of the compressor when the suction pressure of the compressor increases, and wherein the variable displacement mechanism decreases the discharge capacity of the compressor when the control value from the control unit decreases; and
wherein the control unit includes
a determining means for determining an acceleration state of an engine that drives the compressor, wherein the engine also drives a vehicle,
a detecting member which detects a thermal load of the refrigerant cycle device,
a setting means for setting an acceleration state value of the control value, in accordance with the thermal load detected by the detecting member, when the determining means determines the acceleration state of the engine, wherein the setting means causes the acceleration state value to decrease as the thermal load increases, and a controlling means for reducing the control value applied to the variable displacement mechanism from a value that was set prior to the reduction to the acceleration state value set by the setting means and subsequently returns the control value from the acceleration state value to the value that was set prior to the reduction, when the determining means determines the acceleration state of the engine.

13. The control system according to claim 12, wherein when the thermal load is equal to or larger than a predetermined value, the setting means causes the acceleration state value to be smaller as compared with a case in which the thermal load is smaller than the predetermined value.

14. The control system according to claim 12, wherein the setting means sets a rate of decline of the acceleration state value with respect to thermal load so that, if the thermal load is larger than a predetermined load, the rate of decline is reduced as compared with a case where the thermal load is smaller than the predetermined load.

15. The control system according to claim 12, wherein the detecting member detects the thermal load by detecting a temperature of air cooled by the evaporator.

16. The control system according to claim 12, wherein the detecting member detects the thermal load by detecting a suction pressure of the compressor.

17. The control system according to claim 12, wherein the controlling means suddenly reduces the control value applied to the variable displacement mechanism from the value before the reduction to the acceleration state value and subsequently gradually increases the control value from the acceleration state value to the value that was set prior to the reduction, when the determining means determines that the acceleration state of the vehicle engine has occurred.

18. The control system according to claim 12, wherein the controlling means is configured so that the reduction of the control value is relatively sudden, and the return of the control value to the value that was set prior to the reduction is relatively gradual.

19. The control system according to claim 12, wherein the acceleration state is a state in which the engine is determined by the determining means to be accelerating the vehicle, and the acceleration state value is a value taken by the control value only when the engine is in the acceleration state.

20. A control apparatus for controlling a discharge capacity of a compressor of a refrigerant cycle device, the control apparatus comprising:
a controller for controlling a discharge capacity of the compressor;
a variable displacement mechanism, which is configured to vary the discharge capacity of the compressor based on a control value supplied by the controller and a suction pressure of the compressor, to cause the suction pressure of the compressor to approach a predetermined suction pressure, wherein the variable displacement mechanism increases the discharge capacity of the compressor when the suction pressure of the compressor increases, and wherein the variable displacement mechanism decreases the discharge capacity of the compressor when the control value from the control unit decreases;
a condition sensor for indicating an operating condition of an engine that drives the compressor, wherein the engine also drives a vehicle;
a load sensor for determining a thermal load on the refrigerant cycle device, wherein
the condition sensor and the load sensor are coupled to the controller;
the controller determines whether a predetermined state of acceleration of the engine exists based on a signal from the condition sensor,
if the predetermined state of acceleration exists, the controller immediately changes the control value from a value that was set prior to the reduction to an acceleration state value, the value of which depends on the thermal load on the refrigerant cycle device, so that the discharge capacity of the compressor is reduced in response to the acceleration, and the controller subsequently returns the control value gradually from the acceleration state value to the value that was set prior to the reduction, and
the controller causes the acceleration state value to decrease as the thermal load increases.

21. The control apparatus according to claim 20, wherein the acceleration state is a state in which the engine is determined by the determining means to be accelerating the vehicle, and the acceleration state value is a value taken by the control value only when the engine is in the acceleration state.

* * * * *